June 19, 1934.　　　H. E. TAUTZ　　　1,963,688
HOLLOW FENCE BAR AND PROCESS OF MAKING THE SAME
Filed Feb. 15, 1933　　2 Sheets-Sheet 2

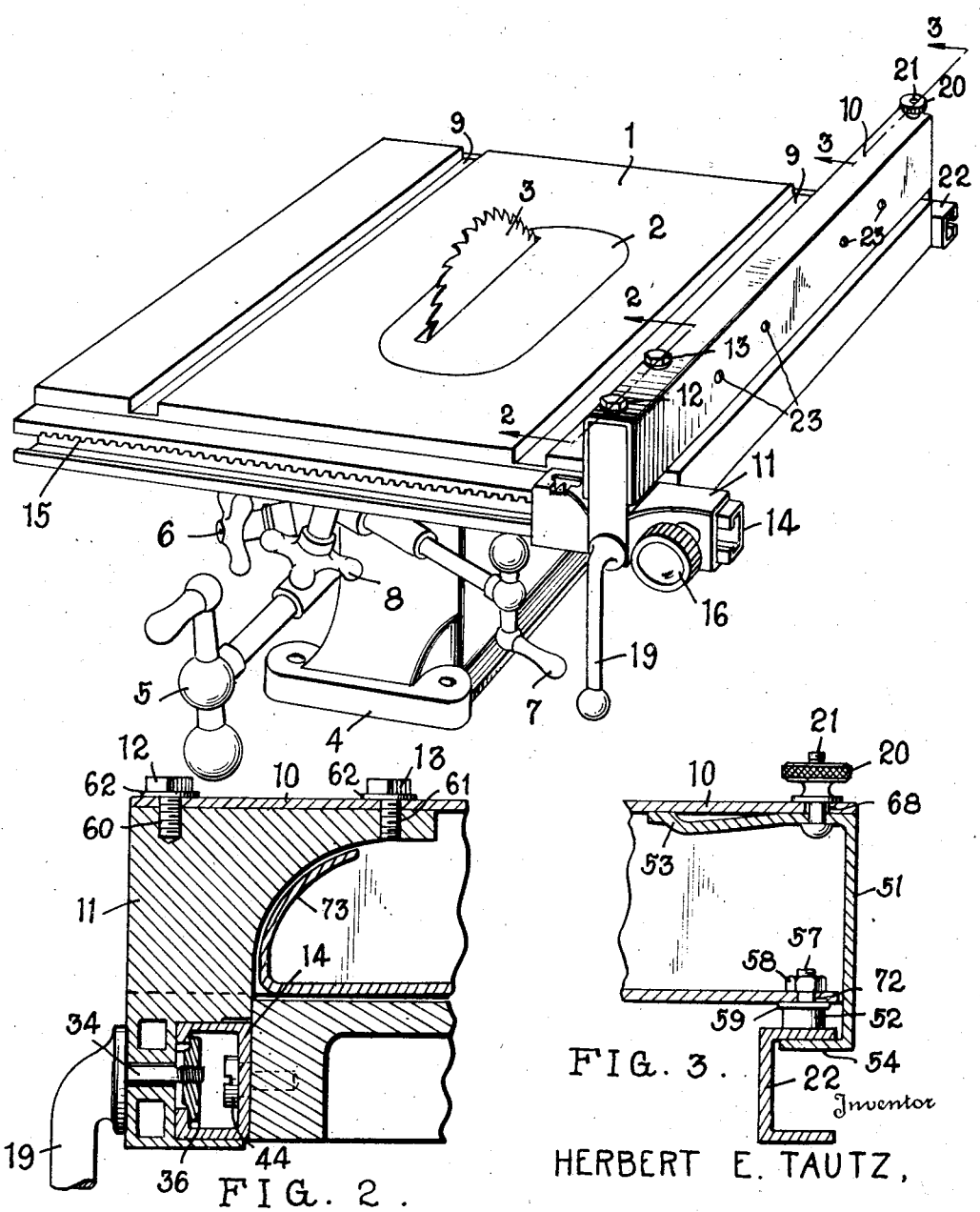

Inventor
HERBERT E. TAUTZ,
By Carl A. Hellmann,
Attorney

Patented June 19, 1934

1,963,688

UNITED STATES PATENT OFFICE 1,963,688

HOLLOW FENCE BAR AND PROCESS OF MAKING THE SAME

Herbert E. Tautz, Milwaukee, Wis., assignor to Delta Manufacturing Company, Milwaukee, Wis.

Application February 15, 1933, Serial No. 656,945

18 Claims. (Cl. 143—168)

The present invention relates to a hollow fence or gage bar and the process of making the same.

More specifically, it deals with members of substantially polygonal cross section which are braced by transverse members secured thereto, preferably by welding.

Still more specifically, the invention relates to a device known as a work-guiding member, gage, or fence, for use with machine tools, such as circular saws, shapers, jointers and the like, adapted to guide a workpiece in proper relation to the cutting tool of the machine to produce certain desired cuts upon said workpiece.

Such work guides when applied to circular saws are customarily known as fences or gages, or more specifically as rip gages, and the invention will, therefore, be described herein as applied to the specific instance where it is embodied in a rip gage for use with a circular saw, without, however, restricting the invention to such specific embodiment.

An object of the invention is to produce a structural element of this nature which is extremely rigid, but nevertheless is very light and which is inexpensive to manufacture.

A further object is to provide an improved process of making such devices.

Referring now specifically to the drawings attached hereto, illustrative of one embodiment of the invention:

Fig. 1 is a perspective view of a machine tool wherein the invention is embodied as a rip gage.

Fig. 2 is a fragmentary detail longitudinal section, on the line 2—2 of Fig. 1, of the forward end of the said rip gage.

Fig. 3 is a fragmentary detail longitudinal section, on the line 3—3 of Fig. 1, of the rear end of the said rip gage.

Figure 4:
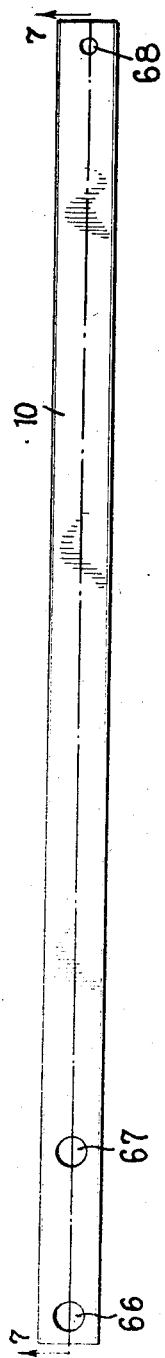
Fig. 4 is a top plan view of the rip gage member, auxiliary parts being omitted.

Referring first to Fig. 1, I have illustrated certain features of my invention as applied to a circular saw comprising a saw table 1 having an insert 2 to receive the saw blade. This saw table is mounted upon a supporting means 4, having suitable manipulating devices and clamping devices for adjusting the table 1 to various heights and inclinations with respect to the saw blade 3. These controls and clamping devices are shown here purely diagrammatically as they do not constitute a part of the present invention. 5 designates the means for raising and lowering the table and 6 the means for clamping said table in its resulting position, while 7 designates means for tilting the table and 8 the corresponding clamping means for retaining it in said tilted position. The top of the saw table 1 is provided with any desired number of grooves, indicated as 9, which are adapted to receive the customary miter gage, which is adapted to slide in said grooves and guide the work to the saw in cross cutting or mitering operations.

In order to guide the workpieces in ripping operations a rip gage 10 is provided having a front fitting 11, secured thereto, for example, by bolts 12 and 13 which permit a slight adjustment of the bar 10 with respect to the fitting 11 in order to bring said parts into proper position, usually at right angles to one another so that the guiding surfaces of the bar 10 may remain parallel to the plane of the saw 3.

The fitting 11 slides upon a channel bar 14 which is provided with suitable rack teeth shown at 15. A knurled knob 16 has a shaft journaled in the fitting 11, carrying a suitable pinion which meshes with the rack teeth 15. The fitting 11 slides freely upon the channel bar 14 and may be adjusted rapidly and accurately to any desired position within its range by turning the knob 16 in the proper direction. A clamping rod or lever 19 is provided to clamp the fitting 11 to the channel bar 14 at any desired position to which it may be adjusted. A suitable clamping nut 20 cooperates with a bolt 21 attached to a fitting 51 mounted in the bar 10, near its rear end, and cooperating with a channel bar 22 to secure the rear end of the bar 10 firmly in an adjusted position and prevent yielding when the saw is used in ripping a workpiece. A number of holes 23, here shown as four, is provided in the rip gage 10 to facilitate attaching any desired auxiliary guides or the like thereto, for use in certain operations. The structures of the fitting 11 and its cooperating parts whereby it may be adjusted with respect to the channel bar 14 and then clamped in its adjusted position, as well as other features of the machine as a whole, are disclosed in detail in my co-pending application Serial No. 655,279, filed February 4, 1933 now Patent No. 1,938,548.

The above description of a circular saw is given herein primarily to illustrate how the rip gage is applied and used in practice.

Upon referring to Fig. 2 it will be noted that the rip gage bar 10 is connected to the fitting 11 by means of bolts or cap screws 12 and 13 engaging in threaded bores 60 and 61, respectively, of the fitting 11, washers 62 being placed beneath the heads of the screws, as shown.

Referring now to Fig. 3 it will be noted that the securing means for holding the rear end of the rip gage bar 10 to the channel bar 22 at the rear of the saw table 1 comprises a U-shaped member 51 having an upper arm 53 and a lower arm 54 extending at right angles to the rear or vertical portion of the said member. A screw-threaded member 21 is rigidly secured to the clamp 51 near its upper bend, the said screw passing through a suitable hole 68 in the upper portion of the gage bar 10 and receiving a clamping nut 20 threaded on the said screw 21. The bottom arm 54 of the U-shaped member 51 will bear against the inner upper surface of the channel member 22 and will draw the bar 10 downward when the nut 20 is tightened. A button 52 may be secured to the lower portion of the bar 10 in any suitable way, for example, by means of a screw-threaded member 57 secured to said button and passing through the lower portion of the gage bar 10, a nut 58 cooperating with said screw 57 to secure the button 52 firmly in place. This button, together with an interposed washer 59, should be of proper thickness to fill the normal space between the bottom of the gage bar 10 and the top of the channel bar 22, thus preventing any bending or straining of the parts when the nut 20 is tightened.

Referring now to Fig. 4 it will be noted that the gage bar 10 is provided with the two apertures 66 and 67, near its one end, to receive the bolts or cap screws 12 and 13 and with a single aperture 68 near its other end to receive the screw 21.

Figure 5:
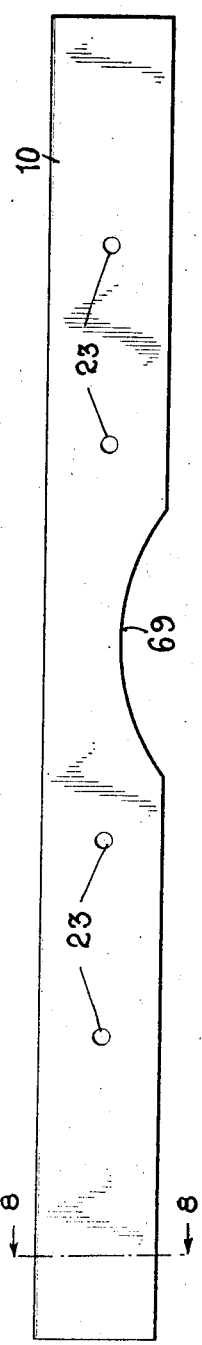
Fig. 5 is a side elevation of the bar shown in Fig. 4.

From Fig. 5 it will be noted that the gage bar 10 has apertures 23 therein, for the purpose already noted, and that said bar may further have a cut-away portion, as shown at 69, although this is not always necessary or desirable and it will be understood that the bar may be straight throughout its lower surface, if preferred. The cut-out feature is desirable in cases where the gage bar is intended to pass over a revolving tool, for example, a dado head or a molding cutter or the like, but obviously would be of little value with an ordinary circular saw blade.

Figure 8:
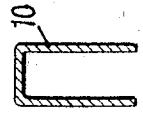
Fig. 8 is a cross section of the bar on the line 8—8 of Fig. 5.
Figure 6:
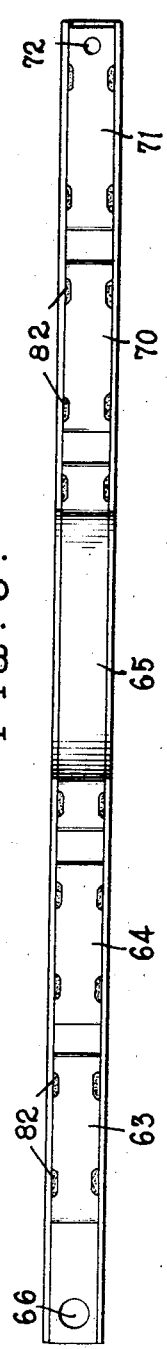
Fig. 6 is a bottom view of the rip gage bar.
Figure 7:
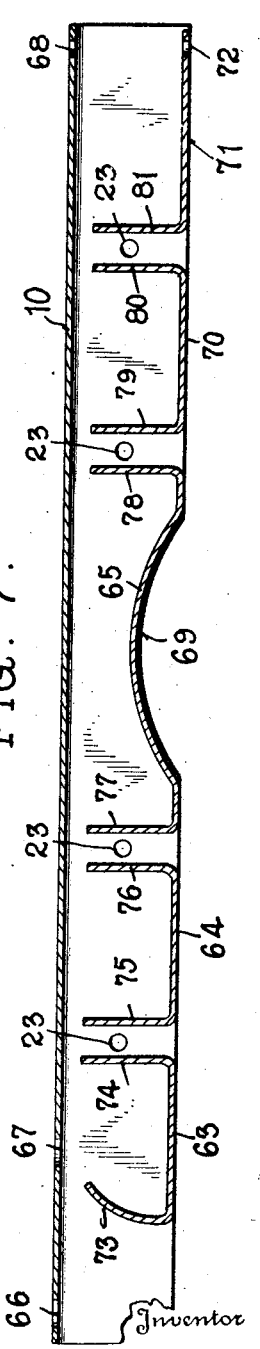
Fig. 7 is a longitudinal, sectional, side elevation of the said bar, the section being made on the line 7—7 of Fig. 4.

It will be noted that the specific bar illustrated in Figs. 4, 5, 6, and 7 consists of a main outer member made of a single piece of metal, U-shaped in cross section, as best shown in Fig. 8, the opening of the U facing downward in the ordinary working position of the gage and that this U-shaped member is reinforced and stiffened by a number of other pieces of material bent into the various shapes best shown in Fig. 7. Three of these pieces, 63, 64 and 70, in the embodiment illustrated are of substantially a U shape, as shown, one 65 is somewhat W-shaped and the remaining one 71 is L-shaped. These particular shapes, however, are not essential, but are convenient in the particular embodiment illustrated and have, therefore, been adopted. It should not be understood, however, that the invention is in any way restricted to any particular shape of the spacer members.

It will be noted that, as shown in Fig. 6 in particular, the said spacers are of just the right width to extend between the two vertical arms of the U-shaped portion of the bar 10. These spacers are secured in any desired way, preferably by welding, to the adjacent edges of the outer member of the bar 10.

Referring to Fig. 7, it will be noted that the substantially U-shaped spacer 63 has one of its arms 73 of an arcuate shape and its other arm 74 straight. The purpose of curving the arm 73 is to provide a fairly close fit against the fitting 11, best shown in section in Fig. 2, whereby the bottom of the gage bar 10 will be closed and reinforced to a point substantially contiguous to the fitting 11. The rear arm 74 of the member 63, while shown as straight, may, of course, be of any other desired or fanciful shape and is made straight merely for simplicity. It will be noted that this arm 74 clears one of the apertures 23 in the gage bar 10.

The next U-shaped member 64 likewise has two straight vertical arms 75 and 76 which clear the adjacent apertures 23. It is, of course, not necessary that the holes 23 be formed between the adjacent arms of two such spacer members and said holes may equally well be placed on either side of any of the said vertical arms. However, by placing the holes 23 in the spaces between such vertical arms additional stiffness of the bar 10 is encountered at such points and the bar cannot readily be distorted by attaching auxiliary guides or the like thereto by means of bolts or screws passing through said holes 23 and this is an advantage of the particular location of the holes 23 disclosed.

The W-shaped spacer 65 is of such shape for the obvious reason that its central bottom curved portion should conform to the cut-out portion 69 of the bar 10, and this spacer likewise has the vertical arms 77 and 78, while the following U-shaped spacer 70 has the straight arms 79 and 80.

The remaining L-shaped spacer 71 has only one vertical arm 81 and this likewise clears the adjacent aperture 23. The horizontal arm of this spacer is provided with an aperture 72 through which passes the screw 57 attached to the button 52, already described. The washer 59, which is preferably rectangular and of the same width as the bar 10, serves to apply some of the stress produced by the rear clamp 51 to the outer member of the bar 10, as will be evident from Fig. 3, thus preventing the entire stress from coming upon the horizontal arm of the spacer 71.

In the manufacture of the bar, a straight blank having the holes 23, 66, 67, and 68 and the arcuate cut-outs 69 formed therein, by drilling, punching, etc., is first bent into the U-shape shown in cross section in Fig. 8. The spacers 63, 64, 65, 70 and 71 are then inserted at the proper locations between the arms or flanges of the U-shaped bar 10 and are secured in any suitable manner, preferably by welding, although it is obvious that they may be secured in other ways in certain cases without sacrificing all the advantages of the invention.

Electric arc welding has been found to be particularly advantageous in manufacturing these bars, although, of course spot welding or welding by means of a suitable blow pipe flame, such as acetylene welding or the like, may also be used, if desired.

It has been found that there is difficulty in causing the spacers to unite properly with the U-shaped member unless certain conditions exist. Owing to the desirable close fit of the spacers between the arms of the U-shaped member it would be difficult to make a satisfactory arc-weld and in order to avoid this difficulty it has been found that if certain portions of the spacers are cut away, to afford room for the flowing molten metal, satisfactory welds can be obtained very easily by means of the electric arc.

Such welds are indicated in 82 on Fig. 6 and it has been found that two welds near each end of each spacer will afford a very satisfactory product. These cut-out portions 82, when the weld is being completed, become filled with metal which is firmly united with each spacer and with the adjacent inner wall of the U-shaped member. It is obvious that such cut-out portions could be provided in the material of the U-shaped bar, instead of in the spacer, with equally good results, but for reasons of ease of manufacture and cheapness of production it is found preferable to provide them in the spacers, rather than in the heavy U-shaped bars themselves. It should, however, be understood that it is immaterial, from a patent standpoint, in which portion these cut-outs are provided and that one is patentably equivalent to the other. It would even be possible to provide the cut-outs partly in each of the members to be joined, but this would merely add apparently unnecessary complications.

It will be noted that the vertical arms of the spacers do not extend to the inside top of the member 10. This avoids any difficulties that would result if it were attempted to make them touch said top, due to imperfect fitting, while at the same time providing all the necessary stiffness or rigidity to the whole structure. The lower parts of the spacers may be flush with the bottom of the bar 10, or slightly above the same.

By making the bar as described, it is evident that a very strong, rigid, and yet light structure will be produced, which is ready for use without machining or grinding any of its outer surfaces. Formerly such bars were usually made of cast metal, requiring expensive machining or grinding to prepare them for use. Moreover, it is obvious that a built-up hollow bar, made in accordance with the present invention, will be free from the danger of breakage, which is always present in a casting.

By reason of the cut-out portions in the spacers, the molten metal is given an opportunity to collect between the parts which are to be connected to one another, thus forming a solid and strong weld, which does not project outward beyond the spacers, thus requiring no finishing or grinding.

It is to be expressly understood that the term "fence", used in the appended claims, is a generic term which is broad enough to embrace any work-guiding element for a wood-working or other machine, such as is variously referred to as a fence, work guide, gage, etc., and the scope of the claims is therefore to be interpreted broadly as to this term.

Having thus described my invention and explained some of the advantages thereof,

I claim:

1. A hollow reinforced fence member comprising an element of substantially U-shaped cross section, and a second element of substantially U-shaped cross section engaged between the arms of the first-named element, the planes of the cross sections being substantially perpendicular to one another, and the bottoms of the U-shaped elements being directed oppositely to one another, the two elements being firmly secured together.

2. A hollow reinforced fence member comprising an elongated element of substantially U-shaped cross section, and a plurality of elements of substantially U-shaped cross section engaged between the arms of the first-named element, the planes of the cross sections of the said plurality of elements being substantially perpendicular to that of the cross section of the elongated element, and the bottoms of the said plurality of U-shaped elements being directed oppositely to that of the elongated element, all the said plurality of elements being firmly secured to the elongated element.

3. A hollow reinforced fence member comprising an elongated element of substantially U-shaped cross section, and a plurality of elements of substantially U-shaped cross section engaged between the arms of the first-named element, the planes of the cross sections of the said plurality of elements being substantially perpendicular to that of the cross section of the elongated element, and the bottoms of the said plurality of U-shaped elements being directed oppositely to that of the elongated element, all the said plurality of elements being welded to the elongated element.

4. A hollow reinforced fence member comprising an elongated element of substantially U-shaped cross section, and a plurality of elements of substantially U-shaped cross section engaged between the arms of the first-named element, the planes of the cross sections of the said plurality of elements being substantially perpendicular to that of the cross section of the elongated element, and the bottoms of the said plurality of U-shaped elements being directed oppositely to that of the elongated element, the said bottoms of all the said plurality of elements being welded to the elongated element.

5. The process of making a hollow reinforced fence member which comprises providing an element bent into U-shaped cross section, providing a spacer of U-shaped cross section and of a length fitting between the arms of the first-named element, and having its arms shorter than those of the first-named U-shaped element, inserting the said spacer between the said arms of the first-named element with its bottom directed oppositely to that of the said element, and welding the bottom of the spacer to the top of the first-named element.

6. The process of making a hollow reinforced fence member which comprises providing an element bent into U-shaped cross section, providing a spacer of U-shaped cross section and of a length fitting between the arms of the first-named element, and having its arms shorter than those of the first-named U-shaped element, inserting the said spacer between the said arms of the first-named element, with its bottom directed oppositely to that of the said element, the outer surface of the said bottom being substantially alined with the ends of the arms of the first-named U-shaped element, and welding the bottom of the spacer to the top of the first-named element.

7. The process of making a hollow reinforced fence member which comprises providing an element bent into U-shaped cross section, providing a spacer of U-shaped cross section and of a length fitting between the arms of the first-named element, and having its arms shorter than those of the first-named U-shaped element, inserting the said spacer between the said arms of the first-named element with its bottom directed oppositely to that of the said element, the outer surface of said bottom being substantially alined with the ends of the arms of the first-named U-shaped element, apertures being provided at the junction between the said bottom and the adjacent ends of the arms of the first-named U-shaped element, and welding the bottom of the spacer to the top of the first-named element, by flowing molten welding metal into the spaces provided by the said apertures.

8. The process of making a hollow reinforced fence member which comprises providing an element bent into U-shaped cross section, providing a spacer of U-shaped cross section and of a length fitting between the arms of the first-named element, and having its arms shorter than those of the first-named U-shaped element, inserting the said spacer between the said arms of the first-named element with its bottom directed oppositely to that of the said element, the outer surface of said bottom being substantially alined with the ends of the arms of the first-named U-shaped element, said bottom having portions thereof adjacent the arms of the first-named U-shaped element cut away, and welding the bottom of the spacer to the top of the first-named element, by flowing molten welding metal into the spaces provided by said cut-out portions.

9. The process of making a hollow reinforced fence member which comprises providing an element bent into U-shaped cross section, providing a plurality of spacers each of U-shaped cross section and of a length fitting between the arms of the first-named element, and having its arms shorter than those of the first-named U-shaped element, inserting each spacer between the said arms of the first-named element with its bottom directed oppositely to that of the said element, the outer surface of said bottom being substantially alined with the ends of the arms of the first-named U-shaped element, and welding the bottom of each spacer to the said adjacent ends of the arms of the first-named element.

10. A reinforced tube of substantially rectangular cross section, for use as a fence member, comprising an elongated member substantially U-shaped in cross section with a plurality of spacers inserted between the arms of the said U-shaped member and firmly secured thereto, the said spacers having arms fitting closely between the arms of the first-named element and thus preventing undue flexure of the same when stresses are applied thereto.

11. A reinforced tube of substantially rectangular cross section, for use as a fence member, comprising an elongated member substantially U-shaped in cross section with a plurality of spacers inserted between the arms of the said U-shaped member, each spacer having a substantially straight portion firmly secured to the arms of the U-shaped member, said spacers also having arms fitting closely between the arms of the first-named element and thus preventing undue flexure of the same when stresses are applied thereto.

12. A reinforced tube of substantially rectangular cross section, for use as a fence member, comprising an elongated member substantially U-shaped in cross section with a plurality of spacers inserted between the arms of the said U-shaped member, each spacer having a substantially straight portion substantially alined with the ends of the arms of the U-shaped member and firmly secured to the said arms, the said spacers also having arms fitting closely between the arms of the first-named element, thus reinforcing the same and preventing undue flexure thereof, when stresses are applied thereto.

13. A reinforced hollow fence bar, substantially rectangular in cross section, comprising an elongated outer member of substantially U-shaped cross section, a plurality of spacers each comprising a bar having a substantially flat portion and at least one arm bent at an angle to said flat portion, the said spacers fitting between the arms of the U-shaped member and being welded thereto with the arms of successive spacers spaced from one another.

14. A reinforced hollow fence bar, substantially rectangular in cross section, comprising an elongated outer member of substantially U-shaped cross section, a plurality of spacers each comprising a bar having a substantially flat portion and at least one arm bent at an angle to said flat portion, the said spacers fitting between the arms of the U-shaped member and being welded thereto, with the adjacent arms of successive spacers spaced from one another, the said fence bar having apertures formed in the arms of the U-shaped member and each opposite the space between the adjacent arms of two consecutive spacers.

15. A reinforced hollow fence bar, substantially rectangular in cross section, comprising an elongated outer member of substantially U-shaped cross section, a plurality of spacers each comprising a bar having a substantially flat portion and at least one arm bent with respect to the flat portion, one of the said spacers having an arm curved backwardly with respect to the same, the said spacer being arranged with its curved arm near one end of the elongated outer member, the said spacers fitting between the arms of the U-shaped member and being welded thereto, with the adjacent arms of successive spacers spaced from one another.

16. A reinforced hollow fence bar, substantially rectangular in cross section, comprising an elongated outer member of substantially U-shaped cross section, a plurality of spacers each comprising a bar having a substantially flat portion and at least one arm bent with respect to the said flat portion, one of the said spacers having an arm at only one end thereof, the said spacer being arranged near one end of the elongated outer member with its single arm directed away from the end of the said outer member, the said spacers fitting between the arms of the U-shaped member and being welded thereto with the adjacent arms of successive spacers spaced from one another.

17. A reinforced hollow fence bar, substantially rectangular in cross section, comprising an elongated outer member of substantially U-shaped cross section, a plurality of spacers each comprising a bar having a substantially flat portion and at least one arm bent with respect to the said flat portion, one of the said spacers having an arm curved backwardly with respect to the same, the said spacer being arranged with its curved arm near one end of the elongated outer member, another of the said spacers having an arm at only one end thereof, the said spacer being arranged near the other end of the elongated outer member, with its single arm directed away from the said end of the said member, the remaining spacers being arranged between the said two end spacers, all the spacers fitting between the arms of the U-shaped member and being welded thereto with the adjacent arms of successive spacers spaced from one another.

18. A reinforced hollow fence bar, substantially rectangular in cross section, comprising an elongated outer member of substantially U-shaped cross section, a plurality of spacers each comprising a bar having a substantially flat portion and at least one arm bent with respect to the said flat portion, one of the said spacers having an arm curved backwardly with respect to the same, the said spacer being arranged with its curved arm near one end of the elongated outer member, another of the said spacers having an arm at only one end thereof, the said spacer being arranged near the other end of the elongated outer member with its single arm directed away from the said end of the said member, the remaining spacers being arranged between the said two end spacers, all the spacers fitting between the arms of the U-shaped member and being welded thereto with the adjacent arms of successive spacers spaced from one another, the said fence bar having apertures formed in the arms of the U-shaped member and each opposite the space between the adjacent arms of two consecutive spacers.

HERBERT E. TAUTZ.